United States Patent [19]

Knutsson et al.

[11] Patent Number: 4,747,150
[45] Date of Patent: May 24, 1988

[54] APPARATUS FOR DETECTING SUDDEN CHANGES OF A FEATURE IN A REGION OF AN IMAGE THAT IS DIVIDED INTO DISCRETE PICTURE ELEMENTS

[75] Inventors: Hans Knutsson; Gösta Granlund; Josef Bigun, all of Linköping, Sweden

[73] Assignee: Context Vision AB, Linkoping, Sweden

[21] Appl. No.: 865,341

[22] Filed: May 21, 1986

[30] Foreign Application Priority Data

May 23, 1985 [SE] Sweden ............................... 8502571

[51] Int. Cl.$^4$ ............................................. G06K 9/48
[52] U.S. Cl. ........................................ 382/21; 382/22; 382/41
[58] Field of Search ..................... 382/50, , 51, 41, 22, 382/21, 56

[56] References Cited

U.S. PATENT DOCUMENTS

| | | | |
|---|---|---|---|
| 3,979,722 | 9/1976 | Sakoe .................................... | 382/21 |
| 4,074,231 | 2/1978 | Yajima et al. ......................... | 382/54 |
| 4,206,441 | 6/1980 | Kondo .................................... | 382/21 |
| 4,361,830 | 11/1982 | Honma et al. ........................ | 382/22 |
| 4,509,195 | 4/1985 | Nadler .................................... | 382/41 |
| 4,618,989 | 10/1986 | Tsukune et al. ....................... | 382/41 |
| 4,644,583 | 2/1987 | Watanabe et al. ..................... | 382/22 |

OTHER PUBLICATIONS

Reprinted from Proceedings of the IEEE Computer Society Conference on Pattern Recognition and Image Processing, PRIP 82, Las Vegas, Jun. 1982. "A Consistency Operation for Line and Curve Enhancement"—Martin Hedlund et al., pp. 1–4.

Primary Examiner—Leo H. Boudreau
Assistant Examiner—Joseph Mancuso
Attorney, Agent, or Firm—Witherspoon & Hargest

[57] ABSTRACT

The invention concerns an apparatus for detecting sudden changes of a feature in a region of an image that is divided into discrete picture elements, the feature being represented by complex valued signals, one for each picture element, the signal phase representing the feature class and the signal magnitude representing the certainty in the feature assertion. The apparatus includes a first unit (3) for providing the complex valued signals (10) within the region and at least a second unit for providing at least two collections of complex valued multiplication factor signals (11, 12, 13) that corresponds to the complex valued signals. The apparatus further has a third unit (4) for forming a measurement signal for each collection of multiplication factors, the measurement signal consisting of the sum of the squares of the magnitudes of a first sum signal, which consists of the complex valued products of the complex valued signals (10) and corresponding complex valued multiplication factor signals (11, 12, 13), and a second sum signal, which consists of the complex valued products of the complex valued signals and corresponding conjugate of the complex valued multiplication factor signals. A fourth unit (5) is provided for a complex valued coefficient weighted summation of a function, which depends on the complex valued multiplication factor signals, of the measurement signals from the third unit (4).

7 Claims, 4 Drawing Sheets

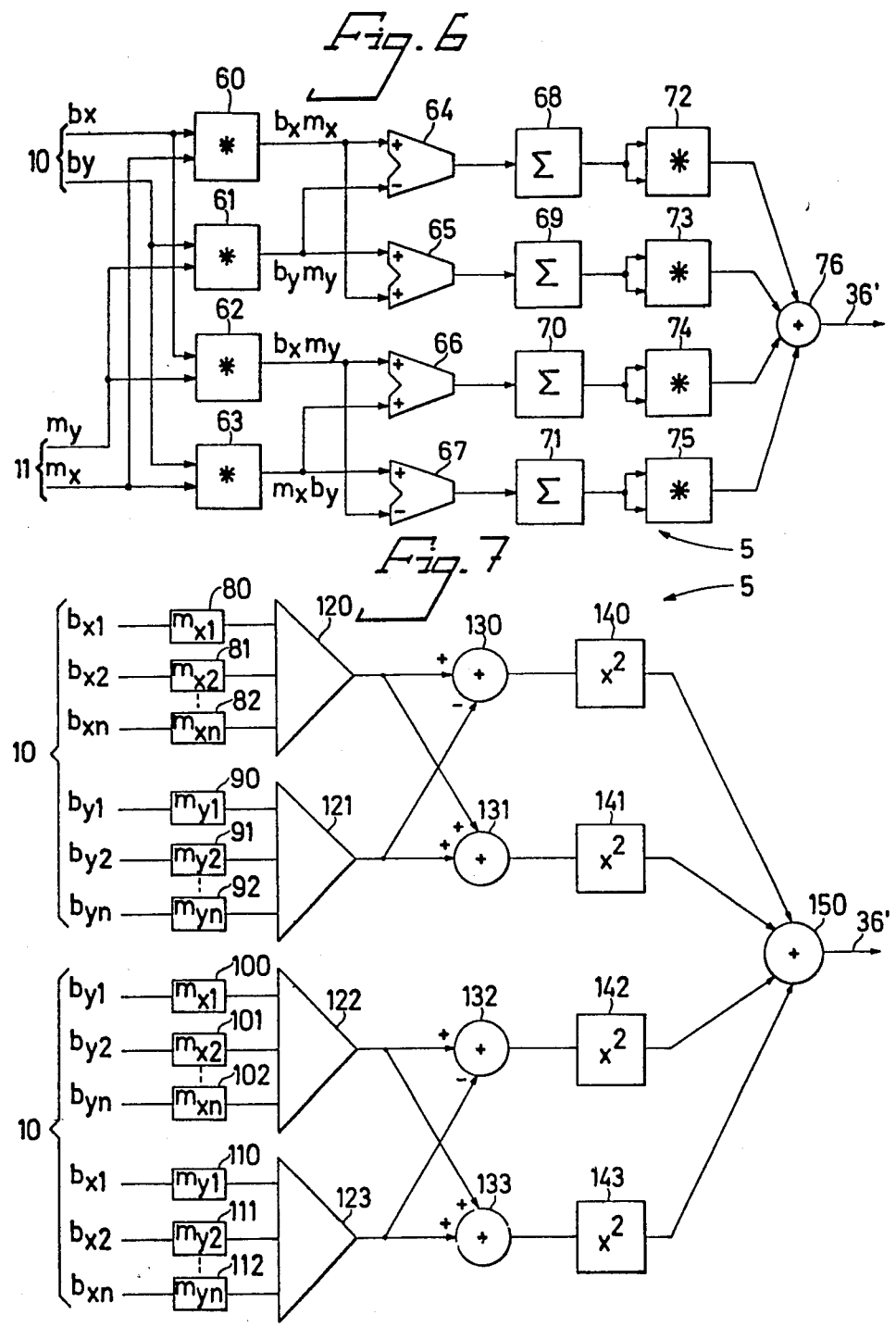

APPARATUS FOR DETECTING SUDDEN CHANGES OF A FEATURE IN A REGION OF AN IMAGE THAT IS DIVIDED INTO DISCRETE PICTURE ELEMENTS

The present invention concerns an apparatus for a quick and reliable detection of regions showing sudden changes of the features in an image.

BACKGROUND OF THE INVENTION

On examining the contents of images it has proven that detecting regions showing sudden changes of different kind, is a very important stage of the analysis. These regions are typically characterized in that one or several features within these regions, show certain specific conditions between different sub-regions. Such suddenly changing features can, for example, give rise to borders between sub-regions with different feature values. One typical case is a texture having features varying from one region to the other, which is described by a discontinuity in a vector field.

One on-going problem has been that descriptions of changes in vector fields have not been able, in a suitable way, to characterize both the changes of the direction and the changes of the magnitude of the vectors. For example it has not been possible with earlier equipment to detect variations of these feature vectors within certain angle regions. It has therefore been difficult to distinguish between regions of certain types if these regions have been characterized by vectors of these directions. Attempts to overcome this problem have centered around efforts in areas relating to computerized image analysis and in particular to methods which have been implemented by means of a program for use with a general purpose computer. However, such methods have been inherently slow.

The present invention concerns an apparatus for distinguishing sub-regions characterized by vectors that differ either in direction or magnitude, or in combination thereof with high speed and reliability.

SUMMARY OF THE INVENTION

The present invention thus offers an apparatus that detects and in a suitable way describes sub-regions of an image that is divided into discrete picture elements, an image characterized by vectors that differ in either direction or magnitude, or a combination thereof.

The features characterizing the invention will be evident from the accompanying patent claims.

It has been proven that such an apparatus with the special applications referred to herein, can be thousands of times faster than a general computer.

The invention will be further described below in regard to an apparatus for the examination of a local region in a digitized image. Digitizing here means that the image is discretized in the spatial sense, resulting in picture elements of a certain size. The values of the picture elements can then be represented either in digital or analog form depending on the implementation of the system. A complete system for the examination of a whole image can either contain a number of such units working in parallel with different regions of the image, or one single unit that successively analyzes each region of the image. These regions can partially overlap each other.

It is here assumed that the features to be observed are represented in the form of complex valued signals or two dimensional vectors, one for each picture element. These vectors represent one feature, for example, dominant orientation. In such a case, each vector is of such a nature that its direction represents the dominant orientation of a structure in the image, while the length of the vector represents the certainty in the assertion of this direction.

For example, in the case of orientation, the feature class of a vertical line would correspond to an horizontal right hand vector arrow, the feature class of an horizontal line would correspond to an horizontal left hand vector arrow, and the feature class of line at forty five degrees would correspond to respective vector arrows pointing upwards and downwards, as the case may be, the length of the arrows representing the assertion of the feature class or the certainty. This vector representation of the image can be obtained for example through the transformation of the original, digitized image, in which each picture element can be allocated a grey scale level or an intensity level combined with a color code, according to the principles disclosed in "IEEE TRANSACTIONS ON COMMUNICATIONS", VOL COM-31, No. 3, March 1983, pp. 388–406.

More particularly, in the processing of a collection of discrete picture elements which represent a region of an image, an apparatus is provided including a means for accessing actual complex valued signals from said collection, one for each of the discrete picture elements, each of the actual complex valued signals having a phase which describes the feature type and a magnitude which describes the certainty in the feature assertion, the actual complex valued signals representing the feature. A means is provided for accessing at least two collections of corresponding complex valued multiplication factor signals 15, 16 for each discrete picture element in the collection, each of the complex valued multiplication factor signals having a phase and a magnitude, the complex valued multiplication factor signals collectively forming a mask which represents a predetermined, idealized variation of the feature in the region. A means coupled to each of the accessing means is also provided for correlating the complex valued image signals to the collections of the corresponding complex valued multiplication factor signals so that at least two measurement signals are outputted by the third means. Means are provided coupled to the correlating means and inputting the measurement signals for summing and norming the measurement signals so that a complex valued output signal is outputted by the fourth means.

The apparatus, by means of which the present invention solves the above indicated problems, can be characterized by a combination of four main units. A first and a second unit provided image data within the viewed region and collections of complex valued multiplicaton factor signals for the corresponding regions, respectively. A third unit contains a number of sub-units which each in a predetermined way correlates the complex valued signals or vectors within the viewed region, with the collections of multiplication factor signals. Eventually a fourth unit will perform a weighted summation of the output signals from the subunits of the third unit.

BRIEF DESCRIPTION OF THE DRAWING

The invention will be further described below with reference to the accompanying drawing, in which:

FIG. 6 shows an alternative embodiment of a sub-unit for correlative calculation, FIG. 7 shows an analog embodiment of a unit for correlative calculation.

DESCRIPTION OF THE PREFERRED EMBODIMENTS

Figure 1:
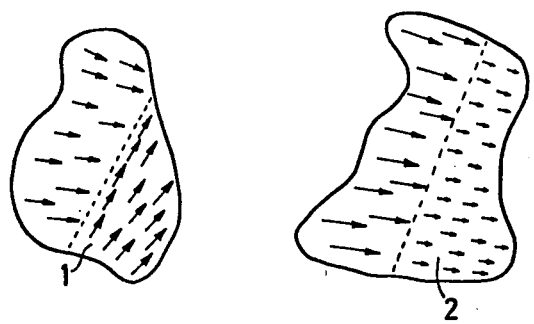
FIG. 1 illustrates the problem situation in question.

FIG. 1 illustrates the current problem situation. A region 1 is formed by two different sub-regions characterized by vector collections or complex valued signals of different directions, which each represents, for example, the structure orientation in the region. A region 2 is formed by two different sub-regions characterized by vector combinations of the same directions but of different magnitudes. The different vector regions can, for example, represent structures of the same orientation but of different contrast within respective sub-regions.

The problem is such that it is desirable, in a quick and reliable way, to be able to detect transitions between different sub-regions of type 1 as well as of type 2, and combinations thereof. It is thus desirable to be able to characterize the degree of difference between different types of sub-regions.

Figure 2:
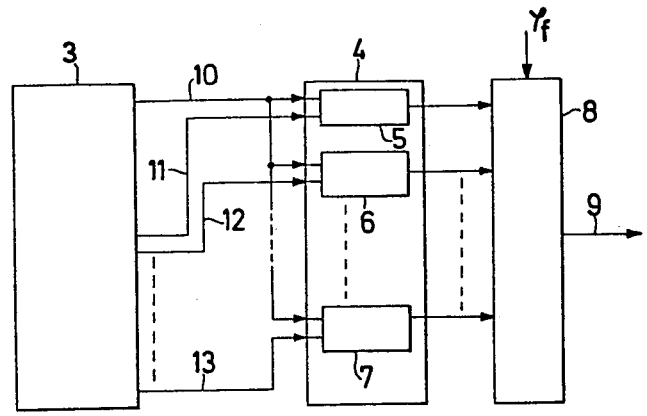
FIG. 2 shows a block diagram of the apparatus according to the present invention.

FIG. 2 shows a block diagram of an apparatus according to the present invention. The Figure shows a unit 3 that provides collections of complex valued multiplication factor signals as well as complex valued signals for a region corresponding to a "window" of a digitized image that is transformed according to the above, within which region a measurement is to be carried out. This region can typically contain 11×11 two-dimensional vectors. The values of the vector components within this region are detected by a unit 4 containing a predetermined number of identical sub-units, three of which have been indicated at 5, 6 and 7. The output results from these sub-units will then be compared in a norming unit 8, where a composite result 9 is obtained. This signal 9 is a measure of the occurence of a sudden variation of the feature within the region in question, and the orientation of the borderline between the two sub-regions of the viewed region formed by this sudden variation.

A first embodiment of the apparatus according to FIG. 2 will now be described with reference to FIGS. 3-5.

Figure 3:
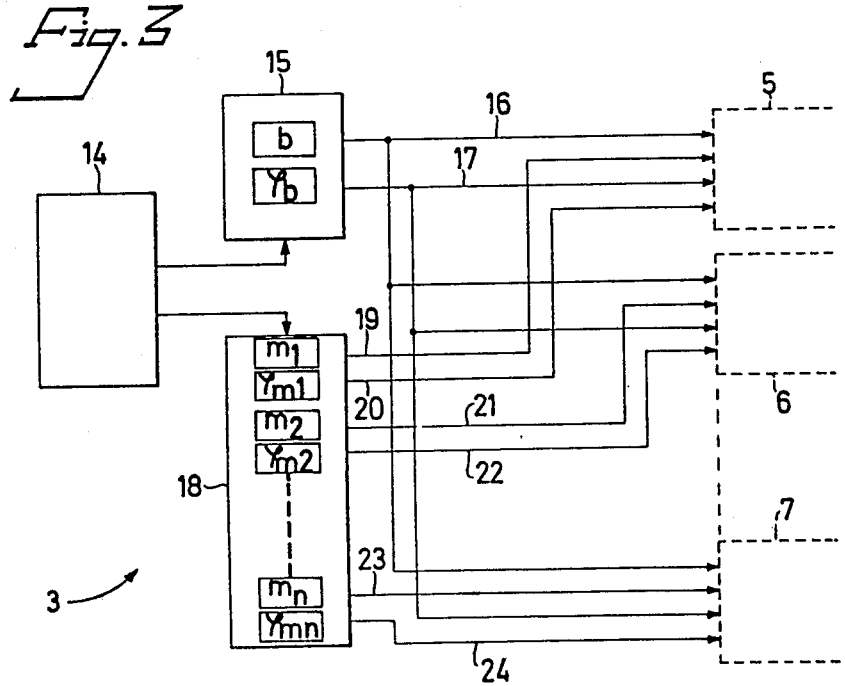
FIG. 3 shows a more detailed block diagram of an addressing unit with memories for image data and collections of multiplication factor signals.

FIG. 3 shows more in detail the unit 3 of FIG. 2 for providing the collections of complex valued multiplication factor signals and complex valued signals for the viewed region. It is here assumed that the different vectors ocurring within a neighborhood around the "measuring point" of the image, the signal 10, as well as the collections of multiplication factor signals, the signals 11, 12 and 13, are represented by magnitude and phase. For example the magnitude can be represented by a number between 0 and 255, i.e. by one byte. In the same way, the phase can also be represented by one byte. Each image element will therefore in one memory be allocated two bytes representing the vector that belongs to the image element. If another kind of digital resolution is desired, other storage allocations are of course conceivable. The data can also be represented in analog form such as voltage or current. An address generator 14 provides complex valued signals from the image data memory 15 for a neighborhood around the measuring point in the form of magnitude 16 and phase 17. The address generator 14 also provides corresponding collections of complex valued multiplication factor signals from a coefficient memory 18. For the sake of simplicity three different collections of multiplication factor signals are considered in the form of magnitude signals 19, 21, and 23 and phase signals 20, 22 and 24, respectively. The invention is not, however, confined to exactly this number provided that at least two different collections are present. The units 14, 15 and 18 are each well known in the art and are not objectives of this invention.

Figure 4:
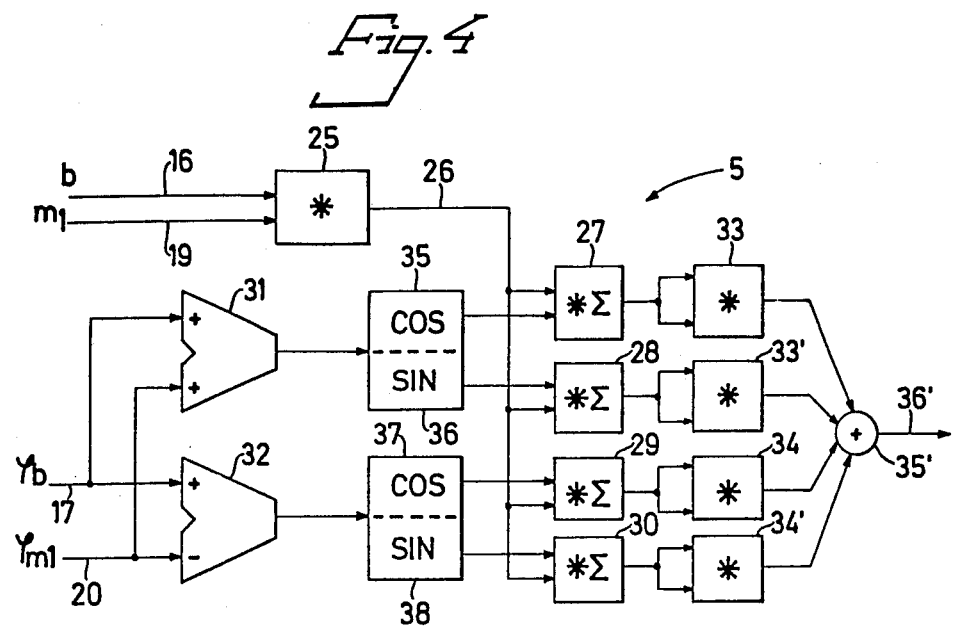
FIG. 4 shows more in detail a block diagram of a sub-unit for correlative calculation of FIG. 2.

FIG. 4 shows more in detail the structure of the sub-unit 5 of the unit 4, which, as was mentioned above, contains a number of identical sub-units 5, 6 and 7 for correlating the complex valued signals or the vectors within the viewed region to said collections of complex valued multiplication factor signals. The number of sub-units are thus in this case equivalent to the number of collections of multiplication factor signals. The function of for example the sub-unit 5 is the following. The magnitude signal 16 of the image memory 15 and the magnitude signal 19 of the coefficient memory 18 are passed to a multiplicator 25. The resulting product component 26 is passed to the multiplying summators 27, 28, 29 and 30. The phase signal 17 of the image memory 15 is combined with the phase signal 20 of the coefficient memory 18 in two adders 31 and 32. In one adder 31 the two phase signals are added, while in the other adder 32 the difference between the phase signals is generated. The obtained phase values are each taken to a corresponding cosine generator such as look up table 35, 37, for cosine and each to a corresponding sine generator such as look up table 36, 38 for sine. The values obtained from these tables are supplied to the earlier mentioned multiplying summators 27, 28, 29 and 30. As an additional input signal for each multiplying summator there is the earlier mentioned magnitude product 26. This results in four product sums for the viewed neighborhood. Each product sum is passed to a squaring unit 33, 33', 34 and 34', after which the four components are combined in an adder 35'.

In the unit 4 there is also included a number of similar subunits exemplified by the references 6 and 7, which have the same principal function as unit 5 but are using other collections 21, 22, 23, 24 respectively of complex valued multiplication factor signals. As already has been mentioned above, the invention is not confined to exactly this number of sub-units, but the number of sub-units can vary depending on the number of collections of multiplication factor signals, which in turn is decided by the different applications. The system can also include just a single sub-unit in which the product sums for all collections of complex valued coefficients are calculated in series, one after the other.

Figure 5:
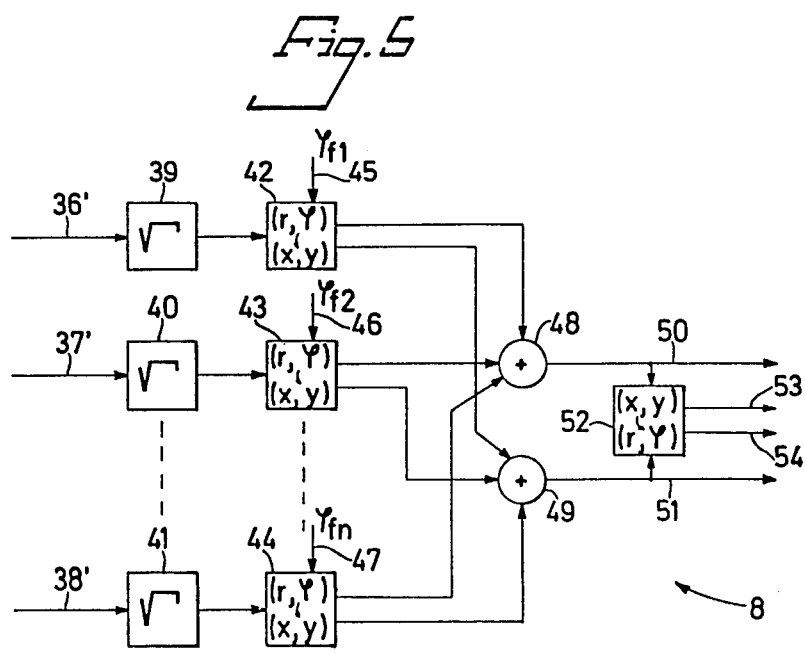
FIG. 5 shows more in detail a block diagram of the unit for a weighted combining of the obtained product sums of FIG. 2.

FIG. 5 shows more in detail the unit 8 of FIG. 2 for summation and norming of the partial results 36', 37' and 38' from respective sub-unit 5, 6 and 7. The partial results are passed through units 39, 40 and 41 each of which is a function generator which serves to extract the square root from the respective measuring signal. Each respective function generator then supplies the respective square root signal to a corresponding weighting means 42, 43 and 44 for a transformation from polar to rectangular representation of complex valued signals. The input signal of such a weighting means 42 is comprised of the magnitude value from the square root extraction function generator 39 as well as partly of a phase value 45, which is presettable or can be modified in a predetermined way from one region of the image to the other. The weighting means 42–44 can possibly also, besides the phase difference of the input signals, multiply these input signals by a magnitude factor, so that a complex valued weighting of the input signals by a magnitude factor, so that a complex valued weighting of the input signals is obtained. The signals that in terms of rectangular coordinates are obtained from the weighting means 42, 43 and 44, are added in adders 48 and 49, the real components in the adder 48, and the imaginary components in the adder 49. The result of the measurement within the viewed neighborhood around the measuring point will thus be present in the form of a complex value signal with a real part 50 and an imaginary part 51. If desirable, the result can be brought into polar form in a rectangular polar converter 52 giving an output result in the form of magnitude 53 and phase 54.

Function generators 39, 40, 41 do not necessarily have to realize a square root extracting function. Also other functions of the input signal are possible. The function generators can for instance realize the function $X^\alpha$, where X represents the input signal to function generators 39, 40 and 41, respectively, and $\alpha$ is an exponent between 0.1 and 100, preferably between 0.25 and 2. Other functions of interest are for instance exponential and logarithmic functions. The choice of function depends on the selected multiplication factors. Generally, however, the function should be monotonic.

It has been described above how a measure of a sudden change of a feature and the orientation of the borderline of this change can be obtained in a region around a measuring point, which corresponds to a picture element in the original image. In a corresponding way, the rest of the image elements of the image can also be examined with respect to the occurrence of sudden changes of the feature in neighborhoods around these image elements. This can be done either by an apparatus that successively scans the image by moving the "window" to neighborhoods of new image elements, or by a plurality of apparatus that in parallel scan several neighborhoods. In the above described embodiment the image and coefficient vectors were represented in polar format. Alternatively the viewed signals can be represented by components in rectangular format, one component corresponding to the real part and the other component corresponding to the imaginary part of a complex valued signal. It is also for this implementation assumed that a suitable mechanism, such as an address generator, by using a memory will provide the complex value signals for a neighborhood around the measuring point. The block diagram of FIG. 2 is also in this case applicable for the apparatus.

This alternative embodiment of the invention will now be described more fully with reference to FIG. 6 which shows the structure of unit 5 of this variant. The real part and the imaginary part of the image data 10 and of the coefficients 11, respectively, are supplied to four multiplicators 60, 61, 62 and 63. The output signals from them are passed to four adders 64, 65, 66 and 67. It is to be noticed that one of the inputs of adders 64 and 67 is inverting. Therefore the adders 64, 65 form the real and imaginary part, respectively, of the complex product of the input signals 10, 11, while the adders 66, 67, form the real and the imaginary part, respectively, of the complex product of the input signal 10 and the complex conjugate of the input signal 11. The output signals from the adders are added in four summators 68, 69, 70 and 71. The resulting sum signals are squared in four multiplicators 72, 73, 74 and 75. The squared sum signals are eventually added in an adder 76 for forming the output signal 36'. This signal is identical with the signal 36' of the embodiment of FIG. 4. It is understood that, as in the first embodiment, the units 6 and 7 also in the alternative embodiment are identical with the above described unit 5.

Since the alternative embodiment of unit 5 renders the same output signal as unit 5 of the first embodiment, unit 8 can be used unchanged.

Yet another alternative embodiment of unit 5 is shown in FIG. 7. This embodiment is particularly suitable for an analog implementation of the invention, but can also be used in a digital implementation. In the description below, however, reference is made, solely for the sake of simplicity, to an analog implementation.

The image data signals 10 for the entire viewed neighborhood around the measuring point, e.g. represented by voltage or current, are supplied to implementing means such as sets of resistors or multiplying D/A-converters 80–82, 90–92, 100–102 and 110–112, which represent the corresponding coefficient collection for the same neighborhood. It is to be noticed that the coefficient set and the image data signals, respectively, do occur twice for forming different product combinations. The multiplication is in this case obtained as a reflection of ohm's law. The resulting product signals are added in four summators 120–123, e.g. implemented by feed back operational amplifiers, the output signals of which are combined in four adders 130–133 for forming the real and imaginary part, respectively, of the product sums of the image data signals and the coefficients, respectively of these signals and the conjugate coefficients. These signals are then squared in squaring units 140–143 for a final summation in an adder 150. The output signal 36' is supplied to unit 8 and is there processed in the same way as in earlier described embodiments.

Figure 8:
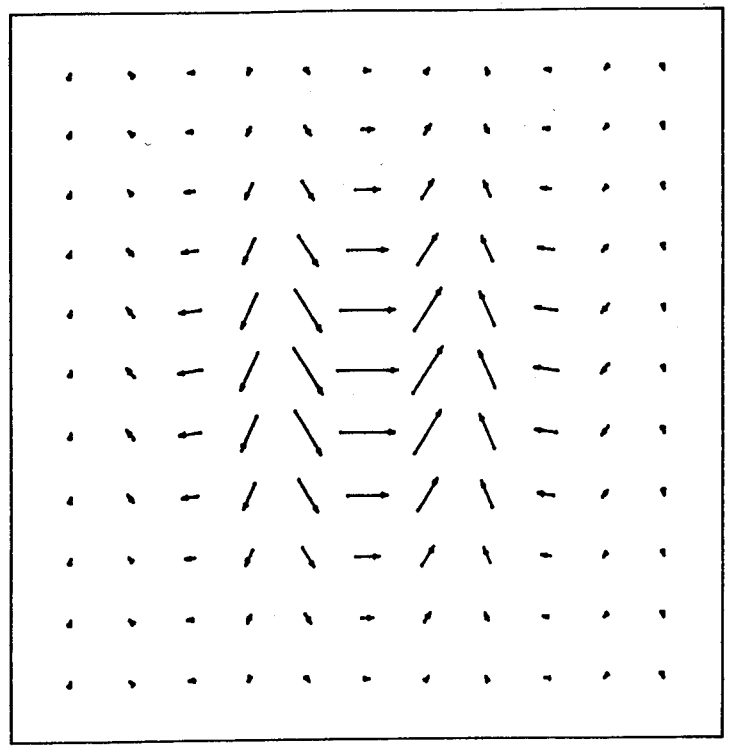
FIG. 8 shows an example of a suitable set of coefficients.

In FIG. 8 there is shown an example of a suitable collection of the multiplication factors intended to be the input signals to one of the units 5, 6, 7. If it is assumed that the region of the image, which is to be viewed, has an extension of 11 × 11 picture elements, the coefficient collection will also have the same extension. It has been proven to be especially advantageous for an apparatus according to the invention to use four subunits 5 and four coefficient collections associated with them. The three remaining coefficient collections will then be copies of the one shown in FIG. 8 which have been rotated counter-clockwise 45, 90 and 135 degrees, respectively, in relation to FIG. 8.

The phase angles 45 to 47 shown in FIG. 5 have under the premises indicated in the previous paragraph preferably the values 0, 90, 180 and 270 degrees, respectively.

Another suitable coefficient collection is represented by a collection that has been rotated 22,5 degrees counter-clockwise relative to FIG. 8. In this case the remaining three collections represent copies that have been rotated counter-clockwise 45, 90 and 135 degrees, respectively, in relation to this rotated collection.

In still another variant the coefficient collections can be rotated in such a way that they do not have the same relative angular displacements.

The invention can of course be varied and modified in many ways within the frame of the principal idea of the invention defined by the accompanying patent claims.

We claim:

1. Apparatus comprising:
   first means for recording a first image of a physical object or scene and dividing said first image into discrete picture elements;
   second means for transforming said first image which has been divided into discrete picture elements into a vector representation, said vector representation comprising complex valued signals,
   third means for accessing said complex valued signals from a plurality of picture elements which collectively form a plurality of overlapping regions of a vector valued image, one complex valued signal for each picture element of said plurality of picture elements, each of said complex valued signals having a phase which describes feature class and a magnitude which describes certainty in feature assertion, said complex valued signals representing said feature;
   fourth means for accessing at least two collections of corresponding complex valued multiplication factor signals for each picture element of said plurality of picture elements, each of said complex valued multiplication factor signals having a phase and a magnitude, said at least two collections of corresponding complex valued multiplication factor signals forming at least two corresponding masks which represent a predetermined, idealized variation of said feature in a respective region of said plurality of overlapping regions;
   fifth means coupled to said third means and said fourth means for correlating said complex valued image signals, for each region of said plurality of overlapping regions, to said at least two collections of said corresponding complex valued multiplication factor signals of a respective region, so that at least two measurement signals are outputted by said third means for each region of said plurality of overlapping regions; and,
   sixth means coupled to said fifth means and inputting said at least two signals for norming and summing said at least two measurement signals so that a complex valued output signal is outputted by said sixth means for each region of said plurality of overlapping regions thereby producing a second image representing characterizing properties of a recorded image of said physical object or scene.

2. Apparatus according to claim 1 wherein said fifth means includes a plurality of correlating units, one each for correlating one of said at least two collections of said corresponding complex valued multiplication factor signals to said complex valued signals so that one measurement signal for each collection is outputted by a respective correlating unit.

3. Apparatus according to claim 2 wherein each of said correlating units comprises a first adder coupled to a first cosine generator and a first sine generator, said first cosine generator being coupled to a first multiplying summator which is coupled to a first squaring unit, and said first sine generator being coupled to a second multiplying summator which is coupled to a second squaring unit, a second adder coupled to a second cosine generator and a second sine generator, said second cosine generator being coupled to a third multiplying summator which is coupled to a third squaring unit, and said second sine generator being coupled to a fourth multiplying summator which is coupled to a fourth squaring unit, a first multiplicator coupled to said first, second, third and fourth multiplying summators, and a third adder being coupled to said first, second, third and fourth squaring units, the magnitude of said complex valued signals and the magnitude of said complex valued multiplication factor signals being fed to said first multiplicator and a resulting magnitude product signal being outputted from said first multiplicator to said first, second, third and fourth multiplying summators, the phase of said complex valued signals and the phase of said complex valued multiplication factor signals being fed to said first adder for adding and to said second adder for subtracting, the resulting phase signal of said first adder being outputted to said first cosine generator and said first sine generator, so that a first cosine value is fed from said first cosine generator to said first multiplying summator for multiplying by said resulting magnitude product signal to generate a first product sum which is fed to said first squaring unit for squaring and inputted to said third adder, and so that a first sine value is fed from said first sine generator to said second multiplying summator for multiplying by said resulting magnitude product signal to generate a second product sum which is fed to said second squaring unit for squaring and inputted to said third adder, the resulting phase signal of said second adder being outputted to said second cosine generator and said second sine generator, so that a second cosine value is fed from said second cosine generator to said third multiplying summator for multiplying by said resulting magnitude product signal to generate a third product sum which is fed to said third squaring unit for squaring and inputted to said third adder, and so that a second sine value is fed from said second sine generator to said fourth multiplying summator for multiplying by said resulting magnitude product signal to generate a fourth product sum which is fed to said fourth squaring unit for squaring and inputted to said fourth adder, said signals inputted to said third adder being combined in said third adder to generate one of said at least two measurement signals.

4. Apparatus according to claim 2 wherein said sixth means comprises a plurality of function generators, one each for each correlatint unit, each of said function generators being coupled to a corresponding weighting means, each of said weighting means being coupled to a first adder and a second adder, and wherein said measurement signals outputted by respective of said correlating units are inputted by respective of said function generators, each respective function generator outputting a respective function signal to a respective of said weighting means, each respective of said function signals being weighted with a respective predetermined complex valued signal thereby being transformed by each respective of said weighting means from polar to rectangular representation, the real part of said rectangular representation being outputted to said first adder and the imaginary part of said rectangular representation being outputted to said second adder, said first adder outputting a real part of said complex valued output signal and said second adder outputting the imaginary part of said complex valued output signal.

5. Apparatus according to claim 2 wherein each of said correlating units comprises a first multiplicator coupled to one input of a first adder and one input of a second adder, a second multiplicator coupled to a sign inverting input of said first adder and another input of said second adder, a third multiplicator coupled to one input of a third adder and a sign inverting input of a fourth adder, and a fourth multiplicator coupled to another input of said third adder and one input of said fourth adder, said first, second, third and fourth adders being coupled to a first, second, third and fourth summator, respectively, which are coupled to a fifth, sixth, seventh and eighth multiplicator, respectively, which are coupled to a fifth adder, and wherein real parts of said complex valued signals and real parts of said complex valued multiplication factor signals are received by said first multiplicator to be multiplied and outputted to said one input of said first adder and said another input of said second adder as first output signals, imaginary parts of said complex valued signals and imaginary parts of said complex valued multiplication factor signals are received by said second multiplicator to be multiplied and outputted to said sign inverting input of said first adder and said one input of said second adder as second output signals, real parts of said complex valued signals and imaginary parts of said complex valued multiplication factor signals are received by said third multiplicator to be multiplied and outputted to said one input of said third adder and said sign inverting input of said fourth adder as third output signals, and imaginary parts of said complex valued signals and real parts of said complex valued multiplication factor signals are received by said fourth multiplicator to be multiplied and outputted to said another input of said third adder and said one input of said fourth adder as fourth output signals, said first adder forming the real parts of said first and second output signals, said real parts of said first and second output signals being outputted to said first summator for adding, the resulting first sum signals being outputted from said first summator to said fifth multiplicator for squaring, and first squared sum signals being outputted from said fifth multiplicator to said fifth adder, said second adder forming the imaginary parts of said first and second output signals, said imaginary parts of said first and second output signals being outputted to said second summator for adding, the resulting second sum signals being outputted from said second summator to said sixth multiplicator for squaring, and second squared sum signals being outputted from said sixth multiplicator to said fifth adder, said third adder forming the real parts of said third and fourth output signals, said real parts of said third and fourth output signals being outputted to said third summator for adding, the resulting third sum signals being outputted from said third summator to said seventh multiplicator for squaring, and third squared sum signals being outputted from said seventh multiplicator to said fifth adder, and said fourth adder forming the imaginary parts of said third and fourth output signals, said imaginary parts of said third and fourth output signals being outputted to said fourth summator for adding, the resulting fourth sum signals being outputted from said fourth summator to said eighth multiplicator for squaring, and fourth squared sum signals being ouputted from said said eighth multiplicator to said fifth adder, said first, second, third and fourth squared sum signals being combined in said fifth adder to generate one of said at least two measurement signals.

6. Apparatus according to claim 2 wherein each of said correlating units comprises a first implementing means for receiving and processing signals and coupled to a first summator, which is coupled to one input of a first adder and one input of a second adder, said first and second adders being coupled to a first and second squaring unit, respectively, which are coupled to a third adder; a second implementing means for receiving and processing signals and coupled to a second summator, which is coupled to a sign inverting input of said first adder and another input of said second adder; a third implementing means for receiving and processing signals and coupled to a third summator, which is coupled to one input of a fourth adder and one input of a fifth adder, said fourth and fifth adders being coupled to a third and fourth squaring unit, respectively, which are coupled to said third adder; and, a fourth implementing means for receiving and processing signals and coupled to a fourth summator, which is coupled to a sign inverting input of said fourth adder and another input of said fifth adder; and wherein real parts of said complex valued signals are received by said first and fourth implementing means and imaginary parts of said complex valued signals are received by said second and third implementing means, said first and fourth implementing means multiplying said real parts of said complex valued signals, respectively, by corresponding real parts of said complex valued multiplication factor signals and imaginary parts of said complex valued multiplication factor signals, respectively, to produce first and second output signals, respectively, which are fed to said first and fourth summators, respectively, which sum said first and second ouput signals, respectively, and generate a first and second intermediate sum signal, respectively, said second and third implementing means multiplying said imaginary parts of said complex valued signals, respectively, by corresponding imaginary parts of said complex valued multiplication factor signals and real parts of said complex valued multiplication factor signals, respectively, to produce third and fourth output signals, respectively, which are fed to said second and third summators, respectively, which sum said third and fourth output signals, respectively, and generate a third and fourth intermediate sum signal, respectively said first intermediate sum signal being fed to said one input of said first adder and said third intermediate sum signal being fed to said sign inverting input of said first adder, said first adder summing said first and third intermediate sum signals and generating a first sum signal which is outputted to said first squaring unit for squaring, and a first squared sum signal being outputted from said first squaring unit to said third adder, said first intermediate sum signal also being fed to said one input of said second adder and said third intermediate sum signal also being fed to said another input of said second adder, said second adder summing said first and third intermediate sum signals and generating a second sum signal which is outputted to said second squaring unit for squaring, and a second squared sum signal being outputted from said second squaring unit to said third adder, said fourth intermediate sum signal being fed to said one input of said fourth adder and said second intermediate sum signal being fed to said sign inverting signal of said fourth adder, said fourth adder summing said fourth and second intermediate sum signals and generating a third sum signal which is outputted to said third squaring unit for squaring, and a third squared sum signal being outputted from said third squaring unit to said third adder, and said fourth intermediate sum signal also being fed to said one input of said fifth adder and said second intermediate sum signal also being fed to said another input of said fifth adder, said fifth adder summing said fourth and second intermediate sum signals and generating a fourth sum signal which is outputted to said fourth squaring unit for squaring, and a fourth squared sum signal being outputted from said fourth squaring unit to said third adder, said first, second, third and fourth squared sum signals being combined in said third adder to generate one of said at least two measurement signals.

7. Apparatus of claim 1 wherein said fourth means is for accessing four collections of corresponding complex valued multiplication factor signals for each discrete picture element in said collection.

* * * * *